United States Patent [19]

Bonzer et al.

[11] Patent Number: 5,271,601
[45] Date of Patent: Dec. 21, 1993

[54] REGULATOR VALVE WITH DIAPHRAGM SUPPORT

[75] Inventors: William J. Bonzer, Marshalltown; John W. Duffy, Tama; Douglas C. Pfantz, Melbourne; Gary L. Scott, Marshalltown; William H. Earney, Marshalltown; Robert D. Gaskill, Marshalltown, all of Iowa

[73] Assignee: Fisher Controls International, Inc., Clayton, Mo.

[21] Appl. No.: 921,518

[22] Filed: Jul. 29, 1992

[51] Int. Cl.⁵ .................... F16K 7/12; F16K 31/126
[52] U.S. Cl. ........................... 251/61.1; 251/118
[58] Field of Search ...................... 251/61.1, 118

[56] References Cited

U.S. PATENT DOCUMENTS

| | | | |
|---|---|---|---|
| 2,877,791 | 3/1959 | Rich | 251/61.1 X |
| 3,078,066 | 2/1963 | Moore | 251/61.1 |
| 3,856,046 | 12/1974 | Brown et al. | 251/61.1 X |
| 4,151,230 | 4/1979 | Talbot | 251/61.1 X |
| 4,284,260 | 8/1981 | Baranoff | 251/61.1 X |
| 4,516,604 | 5/1985 | Taplin | 251/61.1 X |
| 4,619,436 | 10/1986 | Bonzer et al. | 251/61.1 |
| 4,624,442 | 11/1986 | Duffy et al. | 251/61.1 |
| 4,659,062 | 4/1987 | Mooney | 251/61.1 |
| 4,744,388 | 5/1988 | Arizumi et al. | 251/61.1 X |

FOREIGN PATENT DOCUMENTS 1152583  8/1963  Fed. Rep. of Germany ..... 251/61.1

OTHER PUBLICATIONS

American Meter Company Manual (Nov. 1990) 25 Pages "Axial Flow Valves—Operation, Control Manifold, Capacity Limiter, Control Loops, Installation & Repair Parts."
Mooney Controls Manual (May 1990) 5 Pages "Installation/Operation/Maintenance Manual For Flowgrid Valve and Regulator".
Mooney Controls Sheet, Two Sided "2" Flanged Single Port Flowgrid Valve" (undated).
Grove Valve & Regulator Company 4-page brochure, "The Grove Model 83—All Stainless Steel Flexflo Regulator" (undated).
4-page bulletin of the Sprague Reguliner Control Valve (Nov. 1980).
4-page brochure of Rockwell (undated).
12-page brochure of Grove Valve and Regulator Company, "Grove Flexflo Regulators" (1966).
4-page bulletin of Sigma Measurement & Process Control Limited, "Sur-Flo Control Valve" (undated).

*Primary Examiner*—Gerald A. Michalsky
*Attorney, Agent, or Firm*—Marshall, O'Toole, Gerstein, Murray & Borun

[57] ABSTRACT

A regulator valve having a globe type valve body includes a deformable diaphragm for controlling the fluid flow between the a fluid inlet and a fluid outlet. The deformation of the diaphragm, which is controlled by a pilot pressure introduced into a control chamber within the valve, causes the diaphragm to selectively covers and uncovers a plurality of apertures in a frustoconical baffle to control the flow through the valve. The valve includes a first diaphragm support provided in the control chamber and a second diaphragm support provided on the opposite side of the diaphragm. The second diaphragm support comprises a plurality of concentric cylinders and cross members which form an upper concave surface to correspond to a convex portion of the diaphragm so that the diaphragm is substantially uniformly supported.

13 Claims, 2 Drawing Sheets

REGULATOR VALVE WITH DIAPHRAGM SUPPORT

BACKGROUND OF THE INVENTION

This invention relates generally to a regulator valve which incorporates a diaphragm to control the flow of fluid through the valve and diaphragm support means for preventing rupture of the diaphragm.

It is well known in the art that a regulator valve may incorporate a deformable elastomeric diaphragm that is used to control the magnitude of fluid flow through the valve. Such valves are disclosed in U.S. Pat. No. 4,624,442, entitled "Control Regulator Having a Rolling Diaphragm, and U.S. Pat. No. 4,619,436, entitled "Control Regulator Having a Fabric Reinforced Diaphragm," both of which are assigned to Fisher Controls International, Inc. and are incorporated herein by reference. To control the flow in such a valve, the diaphragm is controllably deformed, or moved, so that it selectively covers or uncovers a plurality of apertures in a baffle positioned between an upstream fluid inlet and a downstream fluid outlet. The extent to which the apertures are covered by the diaphragm determines the flow rate through the baffle, and thus the valve.

The movement of the diaphragm, and thus the flow rate through the valve, may be controlled by a pilot pressure supplied to a control chamber in fluid communication with one side of the diaphragm. The pilot pressure may be based upon the difference between the fluid inlet and outlet pressures. A diaphragm support element may be included in the control chamber to provide a surface against which the diaphragm may abut to help control its movement.

It is possible for the above-described valves to be improperly used under certain circumstances, such as during "startup." Prior to startup, a regulator valve may be fluidly isolated from the pipeline or conduit to which it is attached by three shutoff valves: an upstream shutoff valve fluidly coupled to the regulator valve inlet, a downstream shutoff valve coupled to the regulator valve outlet, and a pilot shutoff valve. During startup, these three shutoff valves are opened to fluidly couple the regulator valve to the pipeline. During the startup procedure, the inlet shutoff valve should be opened prior to the opening of the pilot shutoff valve. Opening those two valves in that sequence will temporarily cause a relatively large pressure differential across the diaphragm. That pressure differential, although it may be several hundred pounds per square inch (psi), will not rupture the diaphragm because the diaphragm will be supported by the diaphragm support element in the control chamber of the regulator valve.

However, if the fluid inlet and pilot shutoff valves are opened in the wrong sequence during startup, with the pilot shutoff valve being opened first, a relatively large differential pressure may be exerted across the diaphragm in the opposite direction, in which case the resultant force may cause the diaphragm to rupture. The consequences of diaphragm rupture can be serious, causing at least the delay and expense of replacing the diaphragm and perhaps safety hazards or environmental damage.

SUMMARY OF THE INVENTION

The present invention is directed to a regulator valve with a valve body having a fluid inlet and a fluid outlet and a control chamber formed in the valve body. A baffle having a plurality of apertures formed therein is interposed between the fluid inlet and the fluid outlet. A diaphragm having a convex portion is provided adjacent the apertures in the baffle and is responsive to a pilot or control pressure in the control chamber to selectively cover or uncover the apertures in the baffle to control the magnitude of the fluid flow through the valve. A first diaphragm support means is provided on one side of the diaphragm, and a second diaphragm support means, through which fluid flows, is provided on the other side of the diaphragm. The second diaphragm support means is concave to substantially correspond to the convex portion of the diaphragm so that it engages and supports the convex portion of the diaphragm when there is a positive differential pressure across the diaphragm.

In one embodiment, the second diaphragm support means may comprise a plurality of concentric support cylinders and a plurality of cross members interconnecting the concentric support cylinders, with the height of the support cylinders progressively increasing from the center of the second diaphragm support means to the outer portions of the second diaphragm support means, and with the height of the cross members progressively increasing from the center of the second diaphragm support means to the outer portions of the second diaphragm support means.

The features and advantages of the present invention will be apparent to those of ordinary skill in the art in view of the detailed description of the preferred embodiments, which is made with reference to the drawings, a brief description of which is provided below.

DESCRIPTION OF THE PREFERRED EMBODIMENT

Figure 1:
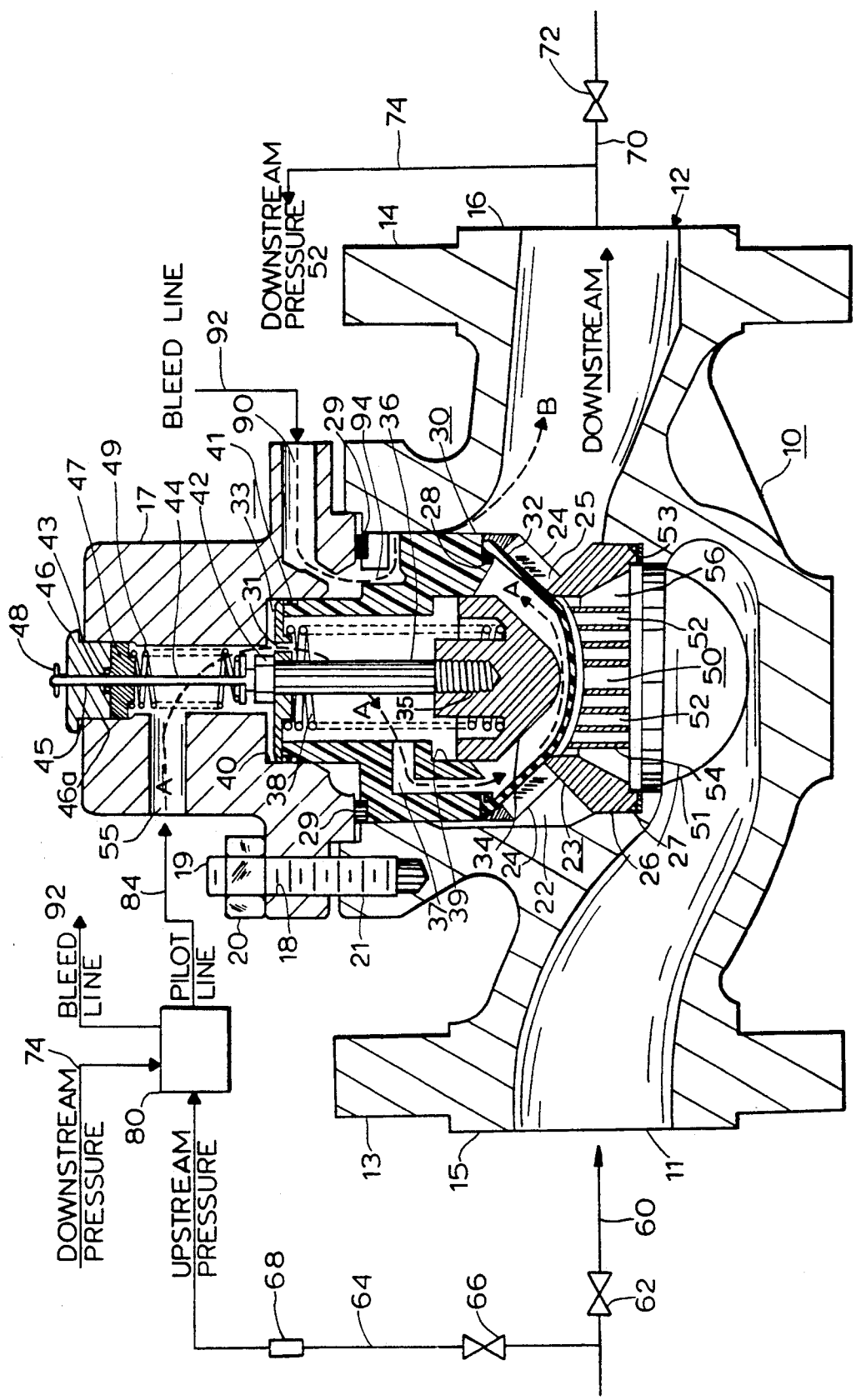
FIG. 1 is a cross section of a preferred embodiment of a regulator valve having a baffle with a lower diaphragm support in accordance with the present invention.

Referring to FIG. 1, a valve body 10 of the globe type includes an upstream fluid inlet 11, a downstream fluid outlet 12 and a pair of mounting flanges 13 and 14. Details of these portions of the valve body are unimportant to the invention and will not be elaborated upon. Suffice it to say that flanges 13 and 14 include a plurality of mounting holes for supporting the valve body in a pipeline with mating surfaces 15 and 16 in sealing engagement with mating surfaces in corresponding pipeline flanges (not shown). The valve body is nonunitary, and includes a bonnet 17 secured to the lower portion of the valve body by a plurality of nuts 20 on studs 19. The studs pass through a corresponding plurality of holes 18 in the bonnet and are secured in the valve body by means of stud supports 21 which, as illustrated, may be threaded holes in the body. Here again it will be appreciated that any number of mounting techniques for removably affixing a bonnet to the lower portion of the valve body may be used, with the stud and nut approach merely being illustrative of one construction. Removable bonnet 17 is oriented at right angles to the valve flow axis and permits removal of internal components of the valve for servicing without the necessity of removing the entire valve from the pipeline.

Interposed between upstream inlet 11 and downstream outlet 12 is a baffle 23 including a frustoconical cage portion 24 defining a plurality of slots or flow apertures 25 therein. The edges of the slots are preferably rounded and otherwise free of sharp surfaces to enhance the life of a contacting, generally spherically shaped diaphragm 32. The diaphragm in FIG. 1 is shown in the fully closed position with the slots 25 being fully covered by the diaphragm to prevent fluid flow from the fluid inlet 11 to the fluid outlet 12 of the valve. FIG. 1 illustrates the natural, underformed shape of the diaphragm 32 when there is no substantial differential pressure across the diaphragm 32.

The bottom portion of baffle 23 rests in a circular recess 26 of the valve body and is sealed to the valve body by compression of an O-ring 27 situated between the rounded bottom portion of baffle 23 and the bottom and side wall of recess 26. A generally cylindrically shaped retainer 30 is positioned above and in contact with the upper peripheral edge of the frustoconical cage portion 24 and includes an outwardly protruding recessed annular lip 28 for captivating and sealing the peripheral edge of diaphragm 32 therebetween. A gasket 29 is provided between a mating surface on the lower portion of bonnet 17 and a corresponding mating surface on the upper part of the retainer 30. When bonnet 17 is placed in position and nuts 20 tightened on studs 19, gasket 29, O-ring 27 and the peripheral edge of diaphragm 32 are compressed to provide respective fluid tight seals. In the same manner, the upper, smaller diameter portion of retainer 30 includes an annual groove in which an O-ring 41 is positioned for providing an edge seal with the cylindrical wall of a circular recess 40 in bonnet 17. The provision of the above mentioned seals assures that there is no fluid communication between the upstream inlet and the downstream outlet except by means of the diaphragm 32 and baffle slots 25.

A movable cone-shaped nose piece 34 is mounted for axial movement in a deep circular recess 39 in retainer 30 in confronting relationship with diaphragm 32. The nose piece 34 is affixed by any convenient means 35 to a shaft 36 and is spring loaded by a compression spring 38, and thus nose piece 34 is urged downwardly toward the center of diaphragm 32. A head 42 on shaft 36 limits the downward movement of nose 34 by contacting the top of retainer 30 which has a circular hole through which shaft 36 passes. As shown, head 42, shaft 36 and retainer means 35 may simply take the form of a shoulder bolt threadingly engaging nose piece 34. An orifice 31 in the top of retainer 30 enables pilot pressure from an inlet 55 to pass into a control chamber 33 provided in the regulator valve. The pilot pressure (indicated by a broken line arrow A) is communicated to the inner surface of diaphragm 32 through a passage 37 in retainer 30.

An indicator shaft 44 contacts the top of head 42 on shaft 36 and extends through a cap 46 secured to the top of bonnet 17 by means of a threaded connection 46a or by any other suitable mounting arrangement. Cap 46 has an axially directed aperture 45 through which indicator shaft 44 protrudes. An O-ring 43 in a circular recess in the bottom of cap 46 provides a sealing engagement between the aperture wall and indicator shaft 44. A backing piece 47 is interposed between the bottom of cap 46 and a light compression spring 49 to provide a bias for maintaining the lower end of indicator shaft 44 in contact with head 42. A travel indicator 48 is affixed to the top of indicator shaft 44 and provides a convenient mechanism for visually indicating the amount that the regulator valve is open to flow. The travel indicator may be a stem, as shown, or may include a backup indicator plate, if desired.

A lower diaphragm support 50 is provided below the diaphragm 32. The support 50 is formed integrally with the baffle 23 so that the baffle 23 and diaphragm support form a unitary body. Alternatively, the support 50 could be provided as a separate element from the baffle 23, in which case the outer diameter of the diaphragm support 50 would generally correspond in size with the annular recess in the baffle 23.

The upper surface or portion of the diaphragm support 50 is concavely curved to generally coincide with the convex shape of the bottom portion of the diaphragm 32 in its position shown in FIG. 1. The diaphragm support 50 has relatively large flow apertures 52 that run along its length from its upper surface to its lower surface, as shown in FIG. 1, to facilitate fluid flow therethrough. When the diaphragm 32 is controlled to uncover the apertures 25 in the baffle 23, fluid flows through the valve from the fluid inlet 11, through the apertures 52 in the diaphragm support 50, through the apertures 25 in the baffle 23 and to the fluid outlet 12.

Figure 2:
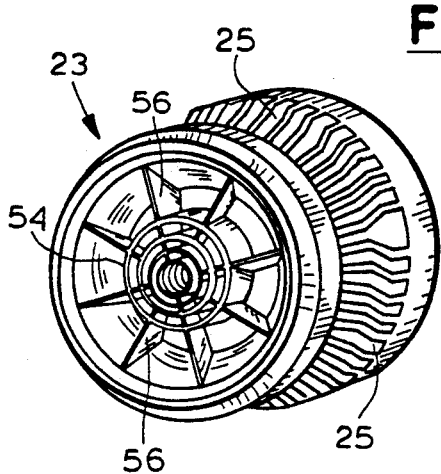
FIG. 2 is a perspective view of the baffle and lower diaphragm support of FIG. 1.
Figure 3:
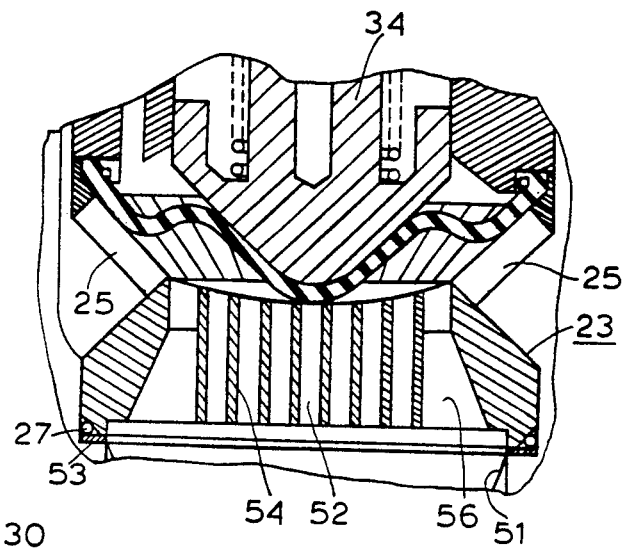
FIG. 3 is a cross section of a portion of the regulator valve of FIG. 1 when the regulator valve is partially open to allow partial flow therethrough.
Figure 4:
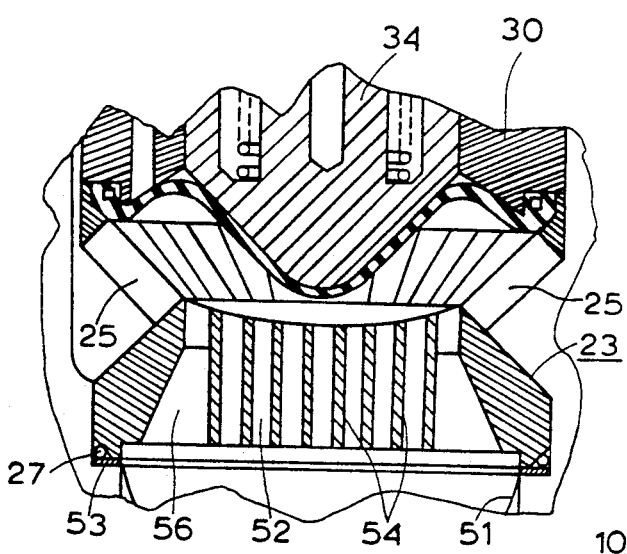
FIG. 4 is a cross section of a portion of the regulator valve of FIG. 1 when the regulator valve is fully open to allow maximum flow therethrough.

The diaphragm support 50, a perspective view of which is shown in FIG. 2, comprises a number of concentric cylinders 54 and cross members 56 which connect the cylinders 54 together to define the flow apertures 52 between the cylinders 54. The cylinders 54 are tallest towards the outermost portions of the support 50 and decrease in height towards the middle of the support 50 (as shown in FIGS. 1, 3 and 4) in order to define the concavely curved upper surface of the support 50. The height of the cross members 56 similarly decreases towards the center of the support 50 to define the curved upper surface of the support 50 as shown in FIGS. 1, 3 and 4.

The concave upper surface of the diaphragm support 50 provides substantially uniform support to the corresponding convex portion of the diaphragm 32. Because all areas of the diaphragm 32 are supported generally equally, rupture or permanent deformation of the diaphragm is prevented. When there is no pressure differential across the diaphragm, the concave upper surface of the diaphragm support 50 may either be in contact with, or in close proximity to, the lower convex surface of the diaphragm 32. When there is a positive differential pressure across the diaphragm 32, defined herein as the case where the fluid pressure on the upper side of the diaphragm 32 (in fluid communication with the control chamber 33) is greater than the pressure on the lower side of the diaphragm, the diaphragm engages and is fully supported by the upper concave surface of the diaphragm support 50.

The diaphragm support 50 does not present any substantial resistance to fluid flow. When the diaphragm support 50 in accordance with the present invention is incorporated into a regulator valve, the reduction in flow through the valve when the valve is fully open is less than about ten percent, and is preferably less than about five percent. That reduction in flow is measured by determining the magnitude of the fluid flow through the valve without the diaphragm support 50 present, and comparing that with the magnitude of the flow through the valve with the diaphragm support 50 present. Both flow measurements are made with the valve fully open.

A hemispherical screen or filter 51 is secured in the fluid inlet 11 directly below the diaphragm support 50 to provide screening or filtering of the fluid passing through the valve. The screen 51 is secured in place by a washer 53 attached to the screen 51. The washer 53 is provided in the circular recess 26 in the valve body. If a screen or filter is not used, a shim (not shown) having the same dimensions as the washer 53 may be provided in place of the washer 53 so that the relative heights of the various components of the valve are the same as those in a valve in which a filter is used.

Referring to FIG. 1, fluid is supplied to the fluid inlet 11 via an inlet fluid line 60 having a shutoff valve 62. The inlet fluid line 60 is connected to an upstream pressure line 64 having a shutoff valve 66 and a variable restrictor 68. Fluid exits the valve via a outlet fluid line 70 connected to the fluid outlet 12 and having a shutoff valve 72. The outlet fluid line 70 is connected to a downstream pressure line 74.

The upstream and downstream pressure lines 64, 74 are connected to a pilot control valve 80 schematically shown in FIG. 1. The pilot pressure control valve 80 generates a control, or pilot, fluid pressure based upon the magnitude of the upstream and downstream pressures supplied to the control valve 80 from the lines 64, 74. Pilot fluid is supplied to the pilot inlet 55 formed in the bonnet 17 via a pilot line 84. The pressure of the pilot fluid supplied via the pilot line 84 is used to control the magnitude of the fluid flow through the valve by controlling the movement of the diaphragm 32. As illustrated by arrow A, the pilot fluid pressure communicates with control chamber 33, which opens to the interior of retainer 30 by means of orifice 31 and extends through a passageway 37 behind diaphragm 32 and in front of nose piece 34. As the pilot pressure is increased, the diaphragm is moved to cover a greater portion of each of the slots 25. In FIG. 1, the valve is in a closed position with diaphragm 12 fully covering each of the slots 25.

Bleed fluid is carried from the pilot control valve 80 to a bleed inlet 90 via a bleed line 92. The bleed fluid passes through bleed inlet 90 to a bleed channel 94 formed in the interior of the valve and passes to the fluid outlet 12, as indicated by a broken line arrow B.

Any type of pilot valve 80 may be used in connection with the valve described herein, and any particular method of control may be used. For example, the pilot valve 80 may control the flow of fluid through the valve to keep a predetermined pressure differential between the upstream and downstream pressures. Other methods of control may be used.

FIG. 3 illustrates the valve in a partially open position with a portion of diaphragm 32 being rolled back against nose cone 34 and exposing portions of slots 25. The diaphragm is moved to this position by a decrease in the pilot pressure in the face of upstream pressure on the other side of the diaphragm and forces nose cone 34 to move upwardly into retainer 30, causing shaft 36 to move indicator shaft 44 and travel indicator 48. Since nose cone 34 is contacted by the center of the diaphragm almost immediately after the pilot pressure is decreased, diaphragm movement is very closely controlled as it drapes over the surface of the nose cone and forces it to move. As a result, any tendency of the diaphragm to fold over or become pinched is eliminated.

In FIG. 4, the fully open position of the valve is illustrated with diaphragm 32 being draped over substantially the full frontal surface of movable nose cone 34. In this position the full areas of the slots 25 are exposed to enable full flow from the upstream inlet to the downstream outlet through the baffle 23. It should be noted that the "arc length" of spherical diaphragm 32, that is, the distance over the surface of the diaphragm between diametrically opposed points on its peripheral lip, is equal to the distance between these points measured along the surface of retainer 30 and across nose cone 34. This dimensioning permits a strong fabric reinforced non-stretch diaphragm to be used. Since the diaphragm is fabric-reinforced and non-stretchable, it must be capable of covering the full extent of the baffle apertures to insure tight closure. The fabric reinforcement also aids in minimizing extrusion of the diaphragm into the apertures of the baffle.

It will also be appreciated by those skilled in the art that the spring loading of nose cone 34 assists in shut-off of the valve. As pilot pressure in the control chamber is increased for shut-off, spring 38 moves the nose cone to help drive the diaphragm toward its position. Thus, nearly all movement of the diaphragm occurs with at least a portion of the diaphragm being draped over and supported by nose cone 34. Only at the final closure position illustrated in FIG. 1, does the diaphragm leave contact with the nose cone. Thus, any tendency for pinching or foldover of the diaphragm is drastically curtailed.

The provision of the lower diaphragm support 50 will prevent rupture or permanent deformation or damage to the diaphragm 32 when the diaphragm is subject to large positive differential pressures. One case in which a large positive differential pressure may occur is during startup of the valve where the startup procedure is performed improperly.

Start-up of the valve occurs when it is installed in a pipeline to initiate flow through the valve. To properly initiate flow through the valve, first the upstream shutoff valve 62 should be opened, then the pilot shutoff valve 66 should be opened, and finally the downstream shutoff valve 72 should be opened. Initially, when the upstream valve 62 is opened, fluid pressure is supplied upwards against the diaphragm 32, in which case the diaphragm engages and is supported by the nose piece 34. Then the pilot shutoff valve 66 is opened, and then the downstream shutoff valve 72 is opened. Since the upstream shutoff valve 62 is opened prior to the pilot shutoff valve 66, there is no substantial positive differential pressure across the diaphragm 32 that would force it downwards, away from the nose piece 34.

However, if the start-up procedure is performed improperly and the pilot shutoff valve 66 is opened prior to the upstream shutoff valve 62, a large positive differential pressure may be generated across the diaphragm 32, forcing it downwards. Although that differential pressure could be very large, such as hundreds of pounds per square inch, the diaphragm 32 will not be ruptured or permanently deformed since the lower diaphragm support 50 will support the lower portion of the diaphragm.

The valve construction described herein, which may be used for liquids or gases, has many additional advantageous characteristics. The globe valve type body arrangement enables ready servicing of the regulator valve by simply undoing the bonnet and removing the entire regulator valve for refurbishing, cleaning or the like. This feature eliminates the need to remove the line bolting and break into the pipeline. Further, the provision of a travel indicator that functions in response to movement of the nose cone provides a visual indication of the amount that the valve has been opened or closed. The non-stretchable diaphragm of reinforced fabric eliminates the tendency for pinching and fold-over and is suitable for use in large temperature extremes and with many caustic solutions and gases. The reinforced fabric diaphragm also resists extrusion into the baffle slots 25 and, as a consequence, has an enhanced service life. While many materials may be used, the diaphragm of the preferred embodiment includes a Dacron fabric embedded in a synthetic rubber.

In some cases, it may be desirable to restrict the magnitude of the flow through the regulator valve to a lower limit than that which the valve would normally be provided. As an example, if the flow capability of the regulator valve was reduced, a smaller relief valve downstream could be used, as would be appreciated by those skilled in the art. In order to restrict the flow through the regulator valve of the preferred embodiment, a trim plate could be used.

Figure 5:
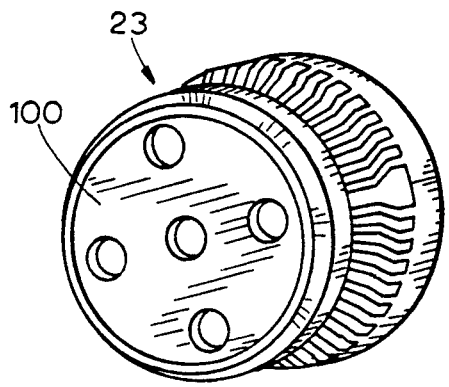
FIG. 5 is a perspective view of the baffle and lower diaphragm support with a trim plate fixed thereto to limit the fluid flow through the valve.

Referring to FIG. 5, a trim plate 100 is shown fixed to the bottom of the baffle 23. The trim plate 100 is a solid plate having five holes or apertures formed therein. The trim plate may be fixed to the bottom portion of the baffle 23 by any means, such as welding or soldering.

Although the trim plate 100 is shown to have five holes, any number of holes may be provided. The number and size of the holes in the trim plate depends upon the extent to which the flow through the valve is to be limited. To limit the flow to a relatively small value, only a few holes of a relatively small size should be used. To limit the flow to a higher value, more holes of a larger diameter would be provided. For example, eight evenly spaced holes of equal size could be provided around the circumference of the trim plate with a ninth hole of the same size provided in the center of the trim plate. Regardless of the number of holes and the diameter of the holes that are used, the holes should be evenly distributed about the trim plate so as to produce substantially uniform flow.

Many modifications and alternative embodiments of the invention will be apparent to those of ordinary skill in the art in view of the foregoing description of the preferred embodiment. This description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A regulator valve comprising:
   a valve body having an upstream fluid inlet and a downstream fluid outlet;
   a control chamber in said valve body;
   a baffle interposed between said fluid inlet and said fluid outlet and having a plurality of apertures formed therein;
   a diaphragm having two sides and arranged for movement with respect to said apertures in said baffle, the movement of said diaphragm being responsive to a pilot pressure in said control chamber to variably cover and uncover said apertures in said baffle to control fluid flow through said valve;
   first diaphragm support means provided in said valve body on a first of said two sides of said diaphragm and being in fluid communication with said control chamber; and
   second diaphragm support means provided in said valve body on a second of said two sides of said diaphragm, said second diaphragm support means being provided between said fluid inlet and said fluid outlet to allow fluid flow through said second diaphragm support means, said second diaphragm support means engaging and substantially uniformly supporting said diaphragm when there is a positive pressure differential across said diaphragm,
   said second diaphragm support means comprising a plurality of concentric support cylinders and a plurality of cross members interconnecting said support cylinders, the height of said diaphragm support cylinders progressively increasing from the center of said second diaphragm support means to the outer portions of said second diaphragm support means, and the height of said cross members progressively increasing from the center of said second diaphragm support means to the outer portions of said second diaphragm support means.

2. A valve as defined in claim 1 wherein said baffle and said second diaphragm support means are part of a unitary element.

3. A valve as defined in claim 2 wherein said diaphragm is reinforced and substantially non-stretchable.

4. A valve as defined in claim 1 wherein said first diaphragm support means comprises a nose piece that is movable with respect to said baffle.

5. A valve as defined in claim 4 wherein said first diaphragm support means includes a spring that biases said nose piece towards said diaphragm.

6. A valve as defined in claim 5 wherein a portion of said diaphragm is convex in shape when there is no differential pressure across said diaphragm and wherein the top portions of said support cylinders and said cross members form a concave surface generally corresponding to the convex shape of said diaphragm portion.

7. A valve as defined in claim 1 additionally comprising a trim plate coupled to said second diaphragm support means for limiting the flow of fluid through said valve.

8. A valve as defined in claim 1 wherein said valve body is non-unitary to allow at least said diaphragm and said baffle to be removed from the valve without the need to remove the valve from a pipeline or conduit to which it may be attached.

9. A regulator valve comprising:
   a valve body having an upstream fluid inlet and a downstream fluid outlet;
   a control chamber in said valve body;
   a frustoconical baffle interposed between said fluid inlet and said fluid outlet and having a plurality of apertures formed therein;
   a diaphragm having two sides and arranged for movement with respect to said apertures in said baffle, the movement of said diaphragm being responsive to a pilot pressure in said control chamber to variably cover and uncover said apertures in said baffle to control fluid flow through said valve, said diaphragm having a first portion with a shape generally corresponding to that of said frustoconical baffle, said diaphragm having a second portion with a convex shape;

first diaphragm support means provided in said valve body on a first of said two sides of said diaphragm and being in fluid communication with said control chamber; and second diaphragm support means provided in said valve body on a second of said two sides of said diaphragm, said second diaphragm support means being provided between said fluid inlet and said fluid outlet to allow fluid flow through said second diaphragm support means, said second diaphragm support means being concave and substantially corresponding with the convex second portion of said diaphragm, said second diaphragm support means engaging and substantially uniformly supporting said diaphragm when there is a positive pressure differential across said diaphragm, said second diaphragm support means comprising a plurality of concentric cylinders joined together by at least two cross members so that said cylinders and cross members define slots which allow fluid communication between said fluid inlet and said fluid outlet.

10. A valve as defined in claim 9 wherein said valve body is non-unitary to allow at least said diaphragm and said baffle to be removed from the valve without the need to remove the valve from a pipeline or conduit to which it may be attached.

11. A valve as defined in claim 9 wherein the structure of said second diaphragm support means reduces the flow through the valve by no more than about ten percent when the valve is fully open.

12. A valve as defined in claim 9 wherein the structure of said second diaphragm support means reduces the flow through the valve by no more than about five percent when the valve is fully open.

13. A regulator valve comprising:

a valve body having an upstream fluid inlet and a downstream fluid outlet;

a control chamber in said valve body;

a frustoconical baffle interposed between said fluid inlet and said fluid outlet and having a plurality of apertures formed therein;

a diaphragm having two sides and arranged for movement with respect to said apertures in said baffle, the movement of said diaphragm being responsive to a pilot pressure in said control chamber to variably cover and uncover said apertures in said baffle to control fluid flow through said valve, said diaphragm having a first portion with a shape generally corresponding to that of said frustoconical baffle, said diaphragm having a second portion with a convex shape;

first diaphragm support means provided in said valve body on a first of said two sides of said diaphragm and being in fluid communication with said control chamber; and second diaphragm support means provided in said valve body on a second of said two sides of said diaphragm, said second diaphragm support means being provided between said fluid inlet and said fluid outlet to allow fluid flow through said second diaphragm support means, said second diaphragm support means being concave and substantially corresponding with the convex second portion of said diaphragm, said second diaphragm support means engaging and substantially uniformly supporting said diaphragm when there is a positive pressure differential across said diaphragm, said second diaphragm support means comprising a plurality of concentric support cylinders and a plurality of cross members interconnecting said support cylinders, the height of said support cylinders progressively increasing from the center of said second diaphragm support means to the outer portions of said second diaphragm support means, and the height of said cross members progressively increasing from the center of said second diaphragm support means to the outer portions of said second diaphragm support means.

* * * * *